UNITED STATES PATENT OFFICE.

CHARLES H. HOPKINS, OF LYNDON, VERMONT.

IMPROVEMENT IN CYLINDER-COCKS FOR LOCOMOTIVES, &c.

Specification forming part of Letters Patent No. 136,724, dated March 11, 1873; reissue No. 6,464, dated June 1, 1875; application filed March 19, 1875.

*To all whom it may concern:*

Be it known that I, CHARLES H. HOPKINS, of Lyndon, in the county of Caledonia and State of Vermont, have invented a new and useful Improved Steam-Cylinder Cock for Locomotives, &c.; and I do hereby declare that the following is a full, clear, and exact description thereof, reference being had to the accompanying drawing, making a part of this specification, and to the letters of reference marked thereon, in which—

Figure 1 is a perspective view of my invention. Fig. 2 is a longitudinal section, in a vertical direction, through the chamber. Fig. 3 is a transverse section through the chamber at line F of Fig. 2, and Fig. 4 a horizontal section in line *x x* of Fig. 3.

My invention relates to a valve or device to be attached to the cylinder of a locomotive, to be used for blowing off the water or condensed steam which accumulates in the cylinder on both sides of the piston; and it consists of a reservoir provided with a threaded plug, by means of which it is attached to the cylinder, and the reservoir has a perforated threaded nut turned into one end, through which moves a short rod. This rod has a plunger-valve upon its inner end, which has its bearings, as it reciprocates within the reservoir, against a series of ribs, which act as guides to the valve, and hold it in proper working position during its forward and back movements. These ribs extend along the inner surface of the reservoir in a longitudinal direction, the spaces $a^2$ between which furnish a free passage for the steam or water passing out. A spring is inserted within the reservoir, one end of which bears against the inner end of the reservoir, and the other end against the plunger-valve, operating to keep the latter firmly pressed against the inner end of the threaded nut, thereby closing the passage from the reservoir out through the nut, the latter having a hole therein, to permit the escape of steam whenever the rod is forced in, moving the plunger-valve in against the spring, and away from its seat at the end of the nut. A projection is made upon the side of the reservoir, having a hole therein, which serves as a guide to a longitudinally-moving rod provided with an adjustable finger, which operates the short rod and plunger in the reservoir.

That others skilled in the art may be able to make and use my invention, I will proceed to describe its construction and operation.

In the drawing, B represents a cylindrical reservoir, provided with a threaded plug, A, having a steam-passage, $a^3$, through it, by means of which plug the reservoir is attached to the cylinder of a locomotive-engine; and the open end of the reservoir has a screw-thread therein, into which is turned a threaded nut, D, which nut has a hole, *c*, therein. (Shown in Fig. 1.) The reservoir B is provided with ribs or valve-guides *a*, (shown in section in Fig. 3,) extending longitudinally along the inner surface thereof, and also has a projection, *b*, around which is placed a spiral spring, *h*. A plunger-valve, *f*, is placed within the reservoir, having its bearings against the longitudinal ribs *a*, and said plunger-valve has a central projection, *i*, thereon, over which is placed one end of the spiral spring *h*, and said spring is kept in a proper central position, with reference to the axes of the reservoir and plunger-valve, by these two projections, *b* and *i*. The plunger-valve has also a rod, E, thereon, which extends out through the opening in the outer end of the nut D, as shown in Figs. 1 and 2; and the plunger-valve is held up against the inner end of the nut D by the action of the spring *h*, and also by the pressure of the steam and water within, the end of the nut being fitted to form a seat, against which the plunger-valve rests. The reservoir has a protuberance, C, upon one end, having a hole, *e*, therein, into which is inserted a longitudinally-sliding rod, *g*, and upon this rod is secured a finger, *n*, which may be moved along the rod to any desired position, and secured by a set-screw, *d*. The rod *g* may be of any desired length, and is connected with other rods extending to the engine-cab, where it may be conveniently operated by the engineer.

The operation of the device is as follows: The finger *n* being secured to the rod *g* in a position just in rear of the plunger rod or stem E, as shown in Figs. 1 and 2, if the engineer desires to open the cock to blow off the condensed steam from the cylinder, the cock being attached to the cylinder underneath, and in a horizontal position, as shown in Fig. 2, he moves the rod *g* in a longitudinal direction, as indicated by the arrow in Fig. 1, the rod sliding along in its guide C, and the finger *n* impinging against the end of the rod or stem E, forcing it in, and moving the plunger-valve away from the inner end of the nut D. The condensed or live steam is then free to pass around the plunger-valve, through the spaces $a^2$ between the longitudinal ribs or valve-guides *a*, and thence out through the nut D and the orifice *c* therein. If the pressure is removed from the sliding rod *g*, the spring *h* operates to force the plunger-valve *f* back against its seat on the inner end of the nut D, and the passage is then closed, preventing any further escape of steam. The rod E, on its return movement, will force back the finger *n* and rod *g*, although the latter may be moved back independent of the movement of the rod E, if desirable. As the reservoir B of my steam-cylinder cock is applied to a locomotive-cylinder in a horizontal position underneath the cylinder, the rod *g* can be applied to the cock in a longitudinal and horizontal position, as shown, and thus be made to operate the stem E and plunger-valve *f* in a corresponding horizontal position and longitudinal direction at every stroke or forward movement of said rod, such positions affording great facility for a direct and simple connection of those parts in order to operate the valve *f*. In order to allow of this being done the plug A, above its connection with the reservoir B, is constructed at right angles, or nearly so, with said reservoir, and when thus constructed, as shown in the figures, the reservoir B will be enabled to be attached to and beneath the locomotive-cylinder in a horizontal position, and thus allow of a stroke or movement of the plunger-valve *f* at an angle with the direction of the inflow of the steam through the plug A; or, in other words, when the plunger or valve *f* is operated in a direction at right angles to the vertical inflow of the steam down the plug, the ready and simple connection of the rod *g* with the stem E can be effected in their horizontal and longitudinal relations with each other, as shown, to operate the plunger or valve *f*.

Heretofore many cylinder-cocks have been made with a plunger or valve seated in the bottom of the plug and operated vertically against the inflow of the steam into the plug; but this plan necessitated the projection of the whole length of the plug down in a vertical direction below the steam-cylinder, and the operating of the plunger or valve by a lever connected with a stem of the valve, which extended down through the bottom of the plug. By this plan the plug was liable to be broken off, owing to undue vertical length in an exposed condition, whereas by my invention my cylinder-cock can lie close up to the cylinder, and is thus protected from extraneous injury. Moreover, the plunger or valve *f*, having its movements under my construction at an angle with the flow of the steam through the plug A, as shown, permits of the use of a straight rod, *g*, to operate the valve without the intervention of a lever adjacent or attached to some part of the cock liable to accidental breakage or derangement.

In practice the reservoir may be reversed in its construction—that is to say, the end of the reservoir into which the nut D is secured may be made solid, but provided with an opening, through which the rod E should protrude, and with a proper seat for the plunger to rest against, and also an orifice, *c*, for the water and steam to escape; and the nut D, which in such case would be made solid, could then be screwed through the rear or opposite end of the reservoir, to support the end of the spring *h;* and in either construction the operation of the plunger-valve *f*, stem E, finger *n*, and rod *g* would be precisely the same.

What I claim, is—

1. A cylinder-cock constructed with its plug A and reservoir B in an angular relation to each other, whereby the seat of the plunger-valve can be located within the reservoir B, and the plunger-valve permitted to move by the action of a tappet from said seat in a direction lengthwise of the steam-cylinder, to which the cock may be applied, and transverse to the steam-passage of the plug A, substantially as described.

2. The plug A and reservoir B, in combination with the plunger-valve *f*, valve-rod E, finger *n*, and longitudinally-sliding rod *g*, arranged and operating substantially as described.

CHARLES H. HOPKINS.

Witnesses:
F. W. SILSBY,
F. H. SMITH.